(12) United States Patent
Timoney et al.

(10) Patent No.: US 7,111,857 B2
(45) Date of Patent: Sep. 26, 2006

(54) TRAILING ARM SUSPENSION ASSEMBLY

(75) Inventors: Eanna Pronsias Timoney, Navan (IE); Sean Timoney, Dublin (IE)

(73) Assignee: Technology Investments Limited, County Meath (IE)

( * ) Notice: Subject to any disclaimer, the term of this patent is extended or adjusted under 35 U.S.C. 154(b) by 137 days.

(21) Appl. No.: 10/448,191

(22) Filed: May 30, 2003

(65) Prior Publication Data
US 2004/0032107 A1   Feb. 19, 2004

(51) Int. Cl.
*B60G 3/12* (2006.01)
(52) U.S. Cl. .............................. 280/124.128
(58) Field of Classification Search ......... 280/124.128, 280/124.11, 124.111, 124.153
See application file for complete search history.

(56) References Cited

U.S. PATENT DOCUMENTS 6,527,286 B1 * 3/2003 Keeler et al. ......... 280/124.135

* cited by examiner

*Primary Examiner*—Faye M. Fleming
(74) *Attorney, Agent, or Firm*—Birch, Stewart, Kolasch & Birch, LLP

(57) ABSTRACT

A suspension assembly has a pair of suspension arms, namely a forward suspension arm and a rear suspension arm. Each suspension arm is pivotally mounted on a housing containing spring means associated with each of the suspension arms. A wheel hub assembly is mounted at an outer end of each suspension arm. An inner end of each suspension arm is connected by a pivot shaft with a lower end of an associated lever arm mounted within the housing. An upper end of the lever arm is connected to the spring means. The spring means opposes pivotal movement of the suspension arm away from a neutral position. Mounting flanges on the housing allow the assembly to be bolted to a floor of a vehicle and adjusted for correct alignment on the vehicle.

26 Claims, 18 Drawing Sheets

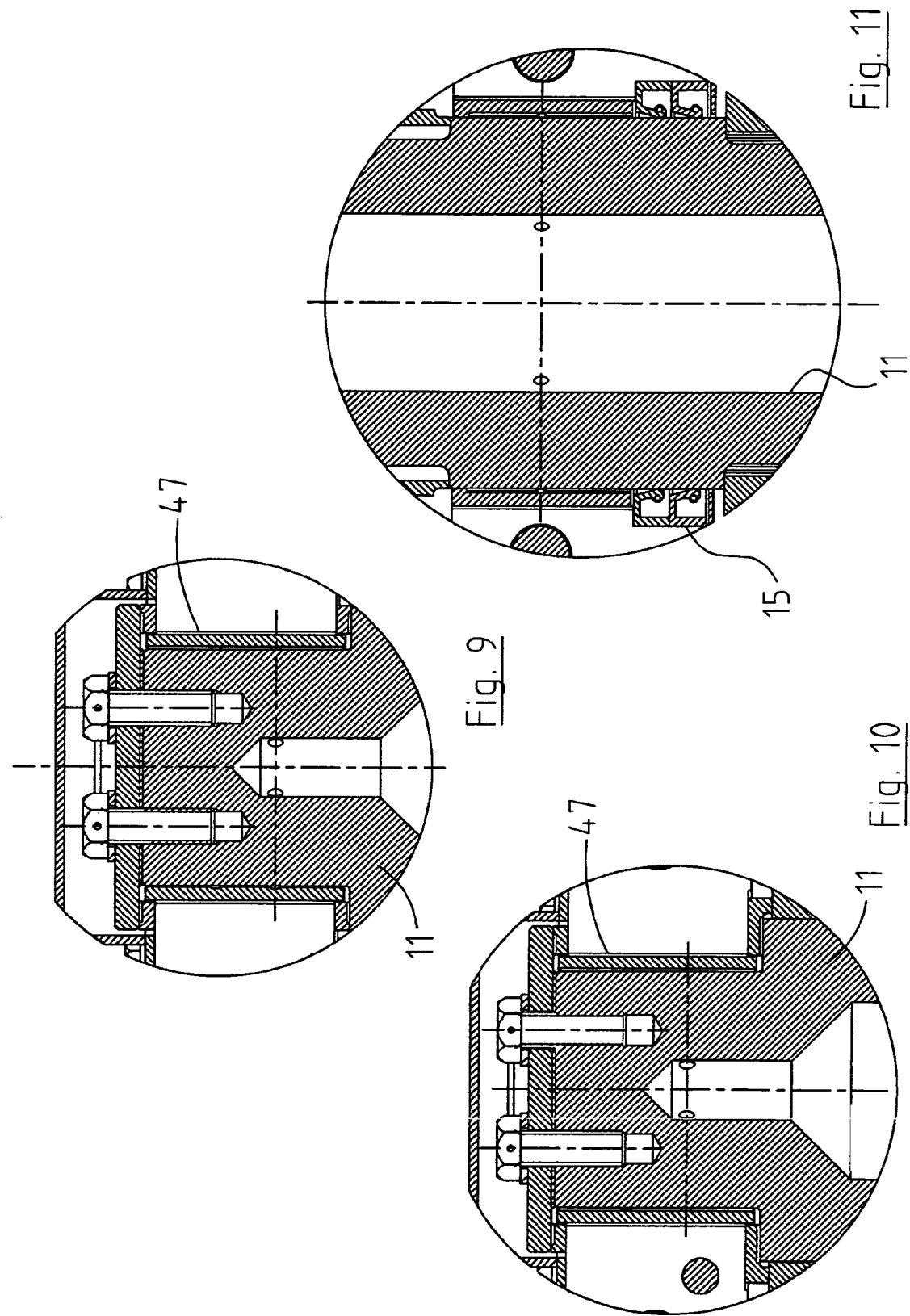

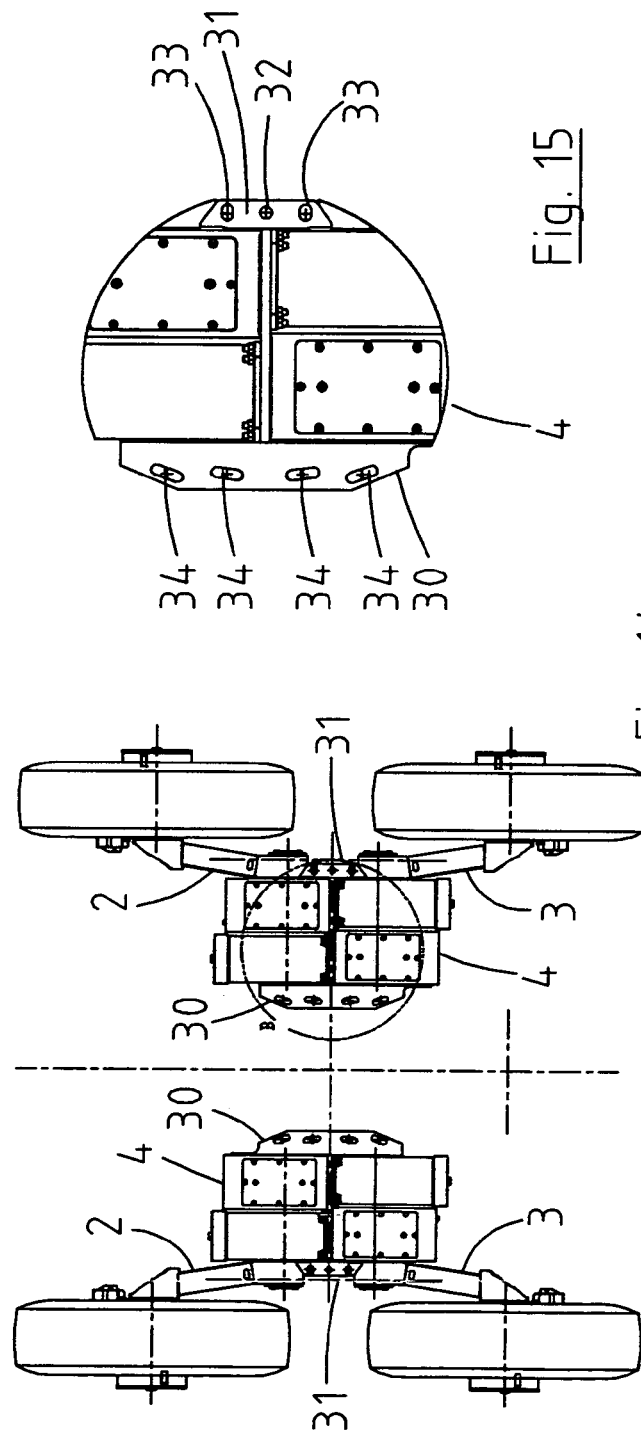
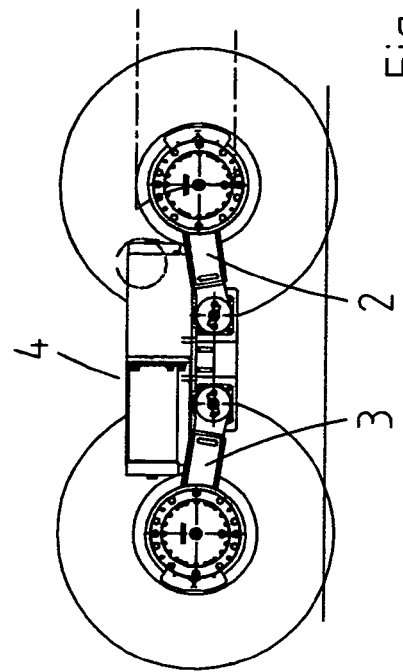

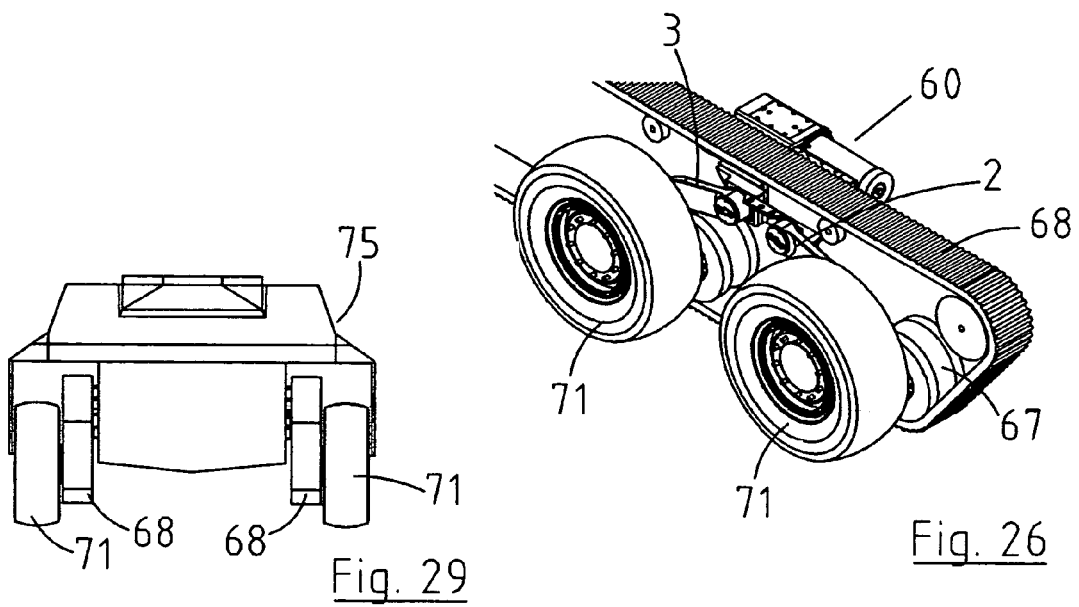
Fig. 26
Fig. 29
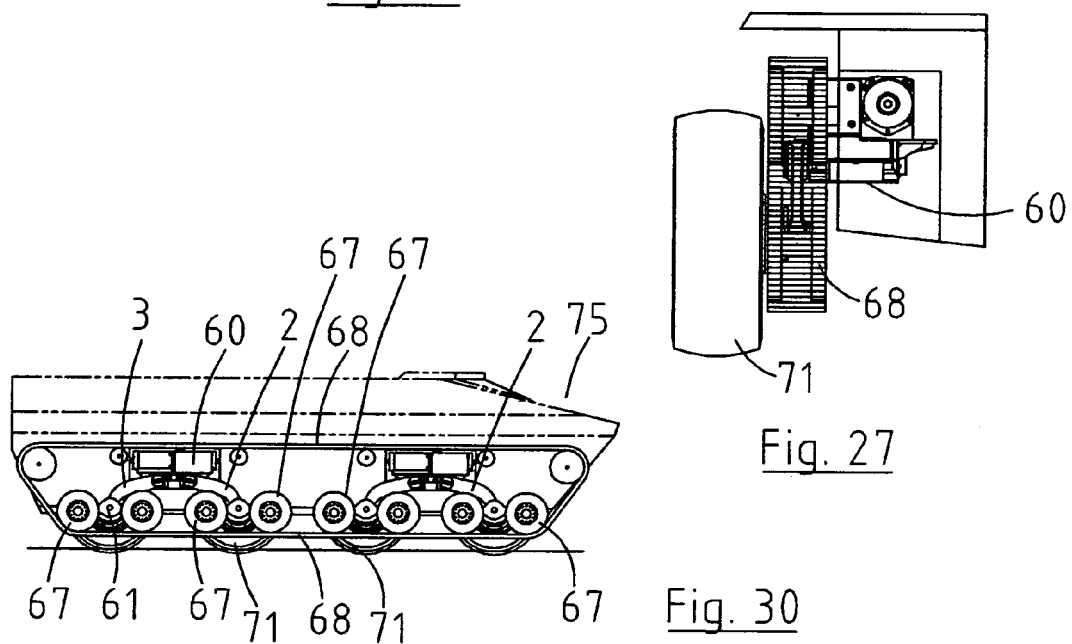
Fig. 27
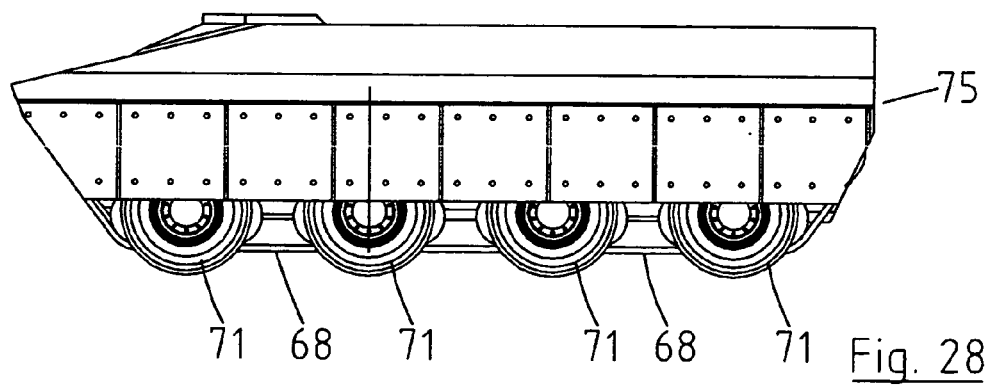
Fig. 30
Fig. 28

TRAILING ARM SUSPENSION ASSEMBLY

This invention relates to a leading or trailing arm suspension assembly in particular for armoured vehicles.

BACKGROUND OF THE INVENTION

Examples of trailing arm suspension systems are to be found in patent specification nos. U.S. Pat. Nos. 4,600,069 and 3,923,112.

In wheeled armoured vehicles the space claim of the suspension system is a critical factor when seeking to maximise the usable interior volume of the vehicle. Typically a wheel well incorporating the suspension system and wheel is built into the vehicle and this intrudes into the interior space of the vehicle reducing the interior volume and causing an obstruction. The suspension assembly is mounted on the side wall of the vehicle hull between the wheel and the hull side wall. Further, in conventional suspension systems spring mounts, bump and rebound stops and control arms are typically mounted on the hull of the vehicle as separate elements thus requiring accurate positioning of these locations on the hull to maintain the correct relationship of the various suspension elements to each other. This presents problems in the manufacture of such vehicles.

The present invention is directed towards overcoming these problems.

It is an object of the present invention to provide a suspension system which greatly reduces the intrusion of the suspension elements into the armoured hull thus maximising usable internal space in the vehicle.

SUMMARY OF THE INVENTION

According to the invention there is provided a modular suspension assembly for an armoured vehicle, including:
  a support frame,
  a pair of suspension units mounted on the support frame, namely a leading arm suspension unit and a trailing arm suspension unit,
  each suspension unit including a suspension arm having an outer end and an inner end,
  said outer end having means for connection to a wheel or track support,
  said inner end being pivotally mounted on the support frame and connected to a spring means on the support frame which opposes pivotal movement of the suspension arm away from a neutral position,
  the suspension arms being pivotal in a vertical plane,
  the support frame having mounting means for securing the support frame to a bottom of a vehicle hull upon which the modular suspension assembly is to be mounted.

In one embodiment the mounting means is adjustable to allow pivoting of the mounting frame about a vertical axis to facilitate correct alignment of the suspension arms on the vehicle hull.

In another embodiment the mounting means comprises a pair of spaced-apart horizontal mounting flanges on the support frame having vertical through holes for reception of associated mounting bolts to secure the mounting frame to the bottom of the vehicle hull.

In a further embodiment the through holes include a circular pivot hole in one flange for reception of a pivot pin and a plurality of elongate slots, a long axis of each slot lying on the circumference of a circle having its centre at the pivot hole.

In another embodiment a pivot axis about which each suspension arm rotates lies beneath the line of action of the spring means.

In another embodiment the spring means for the suspension arms are mounted on the support frame in a substantially horizontal side by side orientation.

In a preferred embodiment the inner end of each suspension arm is connected to a lever arm which in turn acts on the spring means. Preferably the mounting frame has a sealed housing within which the lever arms and spring means associated with the suspension arms are mounted, each lever arm being connected to a suspension arm by a pivot shaft which projects outwardly through a complementary opening in a side wall of the housing, a seal being mounted in said opening about the shaft to seal between the housing and the shaft.

In another embodiment each suspension arm inclines upwardly from the inner end to the outer end of the suspension arm.

In a further embodiment the suspension arm of the front leading arm suspension unit has its outer end located forwardly of its inner end, and the suspension arm of the rear trailing arm suspension unit has its outer end located rearwardly of its inner end.

In another embodiment means is provided at the outer end of each suspension arm for demountably securing a wheel or track support at said outer end.

In another embodiment the spring means is a hydrostrut.

In another embodiment swivel connectors are mounted at each end of the hydrostrut for connection between the hydrostrut and the support frame and the lever arm.

In another embodiment a fork and trunnion connector is provided between the lever arm and the hydrostrut.

In another embodiment an elastomeric flexible mount is provided between the hydrostrut and the support frame.

In another embodiment swivel bearings are provided between each end of the hydrostut and the support frame and the lever arm.

In another embodiment a rocking beam is mounted at an outer end of each suspension arm, a centre of the rocking beam being pivotally mounted on the suspension arm by a pivot pin extending between the beam and the suspension arm for pivotal movement about a horizontal pivot axis, a wheel or track support being mounted at each end of the rocking beam.

In a further embodiment track supports are mounted at each end of the rocking beam and a wheel support is mounted co-axially with the pivot pin on the rocking beam or suspension arm.

In another embodiment the support frame forms a bogie with means for pivotally mounting the bogie on the bottom of the vehicle hull, the bogie having means for connection to a steering system of the vehicle for controlled pivoting of the bogie in response to a steering command from the steering system.

In another embodiment steerable wheels are mounted at the outer ends of the suspension arms by swivel mounts, a steering arm of the swivel mount being connected by a drag link to a fixed mounting point to provide differential steering of the wheels in response to rotation of the bogie.

In another embodiment the housing has means for reacting bump and rebound forces within the housing.

In a further embodiment the lever arm has a rebound stop which is engagable against an inner side wall of the housing.

In another embodiment a bearing is mounted between the spring means and an inner side wall of the housing to transmit bump forces to the housing.

In a particularly preferred embodiment the suspension assembly includes a pair of inline suspension arms, namely a forward suspension arm and a rearward suspension arm, the spring means for the arms being supported in a horizontal juxtaposed overlapping side by side position. Preferably the spring means and the lever arms associated with each of the suspension arms are mounted in a common housing. Various other embodiments are as described in the claims given at the end of this patent specification.

In another aspect the invention provides a modular suspension assembly for a vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a common vertical plane,
the spring means for the suspension arms being mounted on the support frame in a substantially horizontal overlapping side by side orientation.

In another aspect there is provided
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a common vertical plane,
the support frame having mounting means for attachment of the support frame to the underside of a horizontal mounting surface.

DESCRIPTION OF THE DRAWINGS

The invention will be more clearly understood by the following description of some embodiments thereof given by way of example only, with reference to the accompanying drawings, in which;

FIGS. 9 to 11 are detail sectional views of portion of the assembly;

FIG. 12 is an elevation view of the assembly carrying a pair of wheels;

FIG. 13 is an end elevational view showing a pair of the assemblies in position for connection to a vehicle body;

FIG. 14 is a plan view of the pair of assemblies shown in FIG. 13;

FIG. 15 is a detail plan view of portion of the assembly;

FIG. 16 is a perspective view of a vehicle incorporating suspension assemblies of the invention;

FIG. 26 is a detail perspective view of the suspension assembly shown in FIG. 24 further showing a track and wheels mounted on the suspension assembly;

FIG. 27 is an end elevational view of the suspension assembly of FIG. 24 shown mounted on a vehicle;

FIG. 28 is an elevational view of the vehicle incorporating a number of the suspension assemblies shown in FIG. 24;

FIG. 29 is an end elevational view of the vehicle shown in FIG. 28;

FIG. 30 is a sectional elevational view of the vehicle shown in FIG. 28 illustrating mounting of a number of the suspension assemblies shown in FIG. 24 at one side of the vehicle;

DETAILED DESCRIPTION OF THE INVENTION

Figure 1:
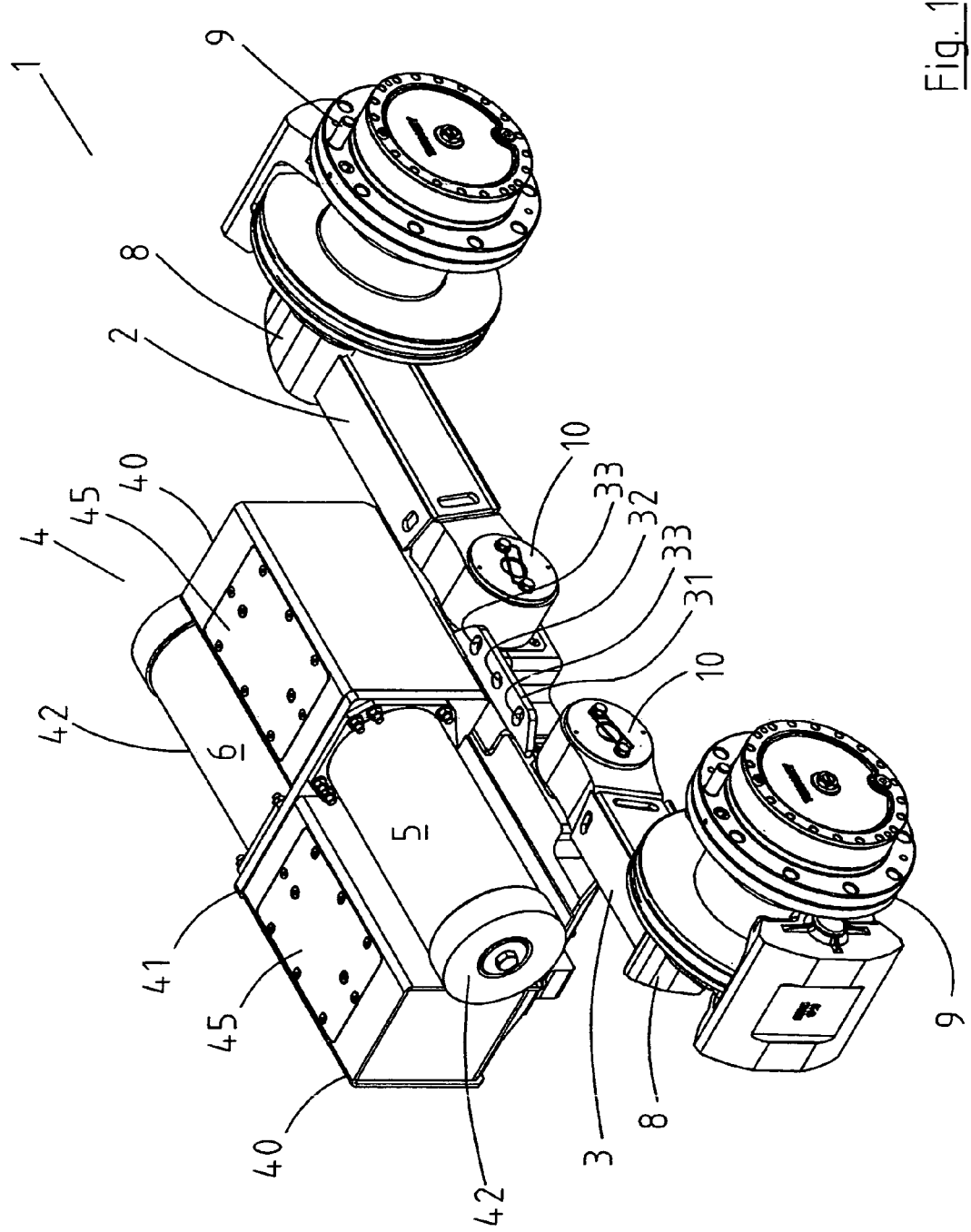
FIG. 1 is a perspective view of a trailing arm suspension assembly according to the invention.
Figure 2:
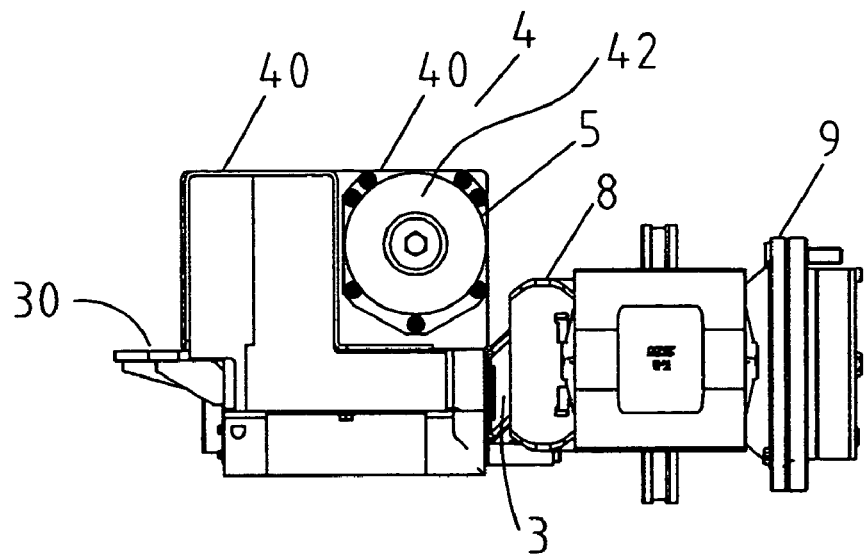
FIG. 2 is an end elevational view of the assembly.
Figure 6:
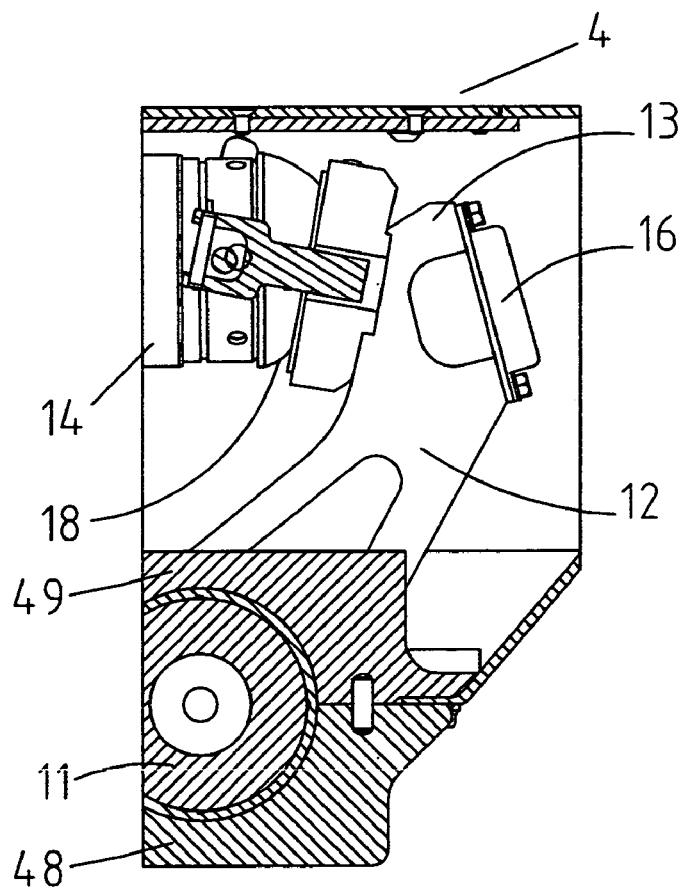
FIG. 6 is a sectional view taken along the line VI—VI of FIG. 4.
Figure 3:
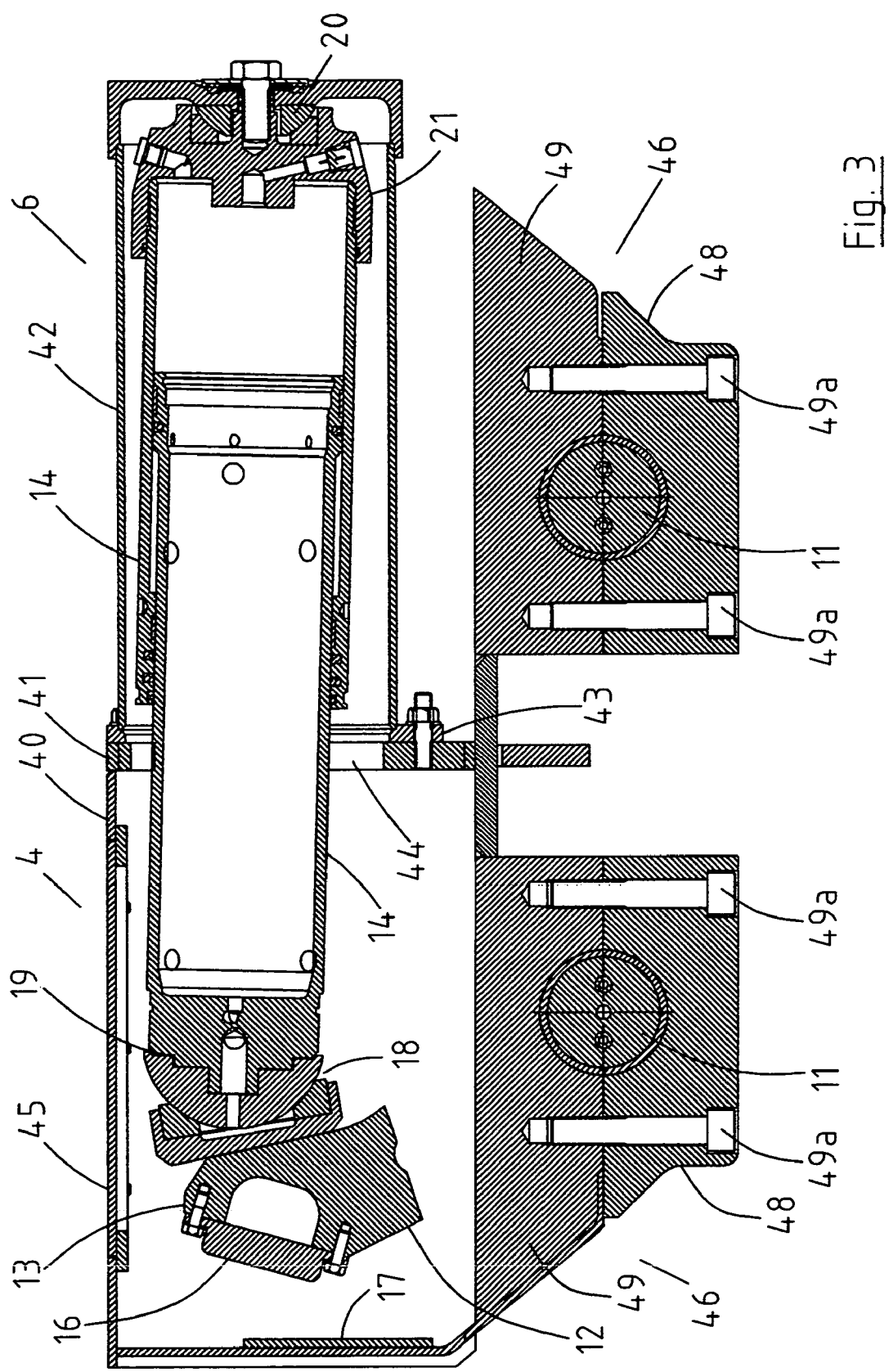
FIG. 3 is a sectional elevational view taken along the line III—III of FIG. 2.
Figure 4:
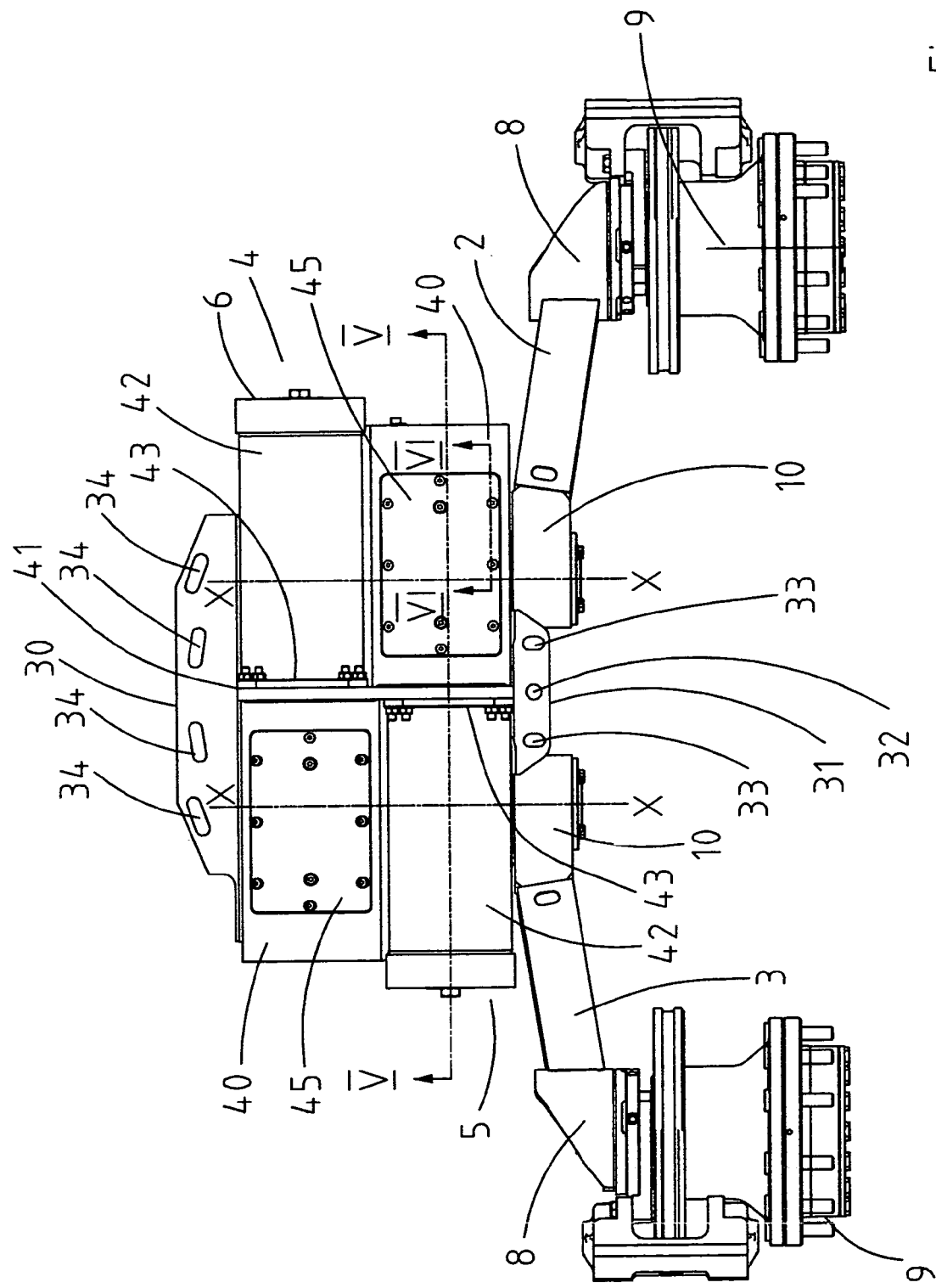
FIG. 4 is a plan view of the assembly.
Figure 5:
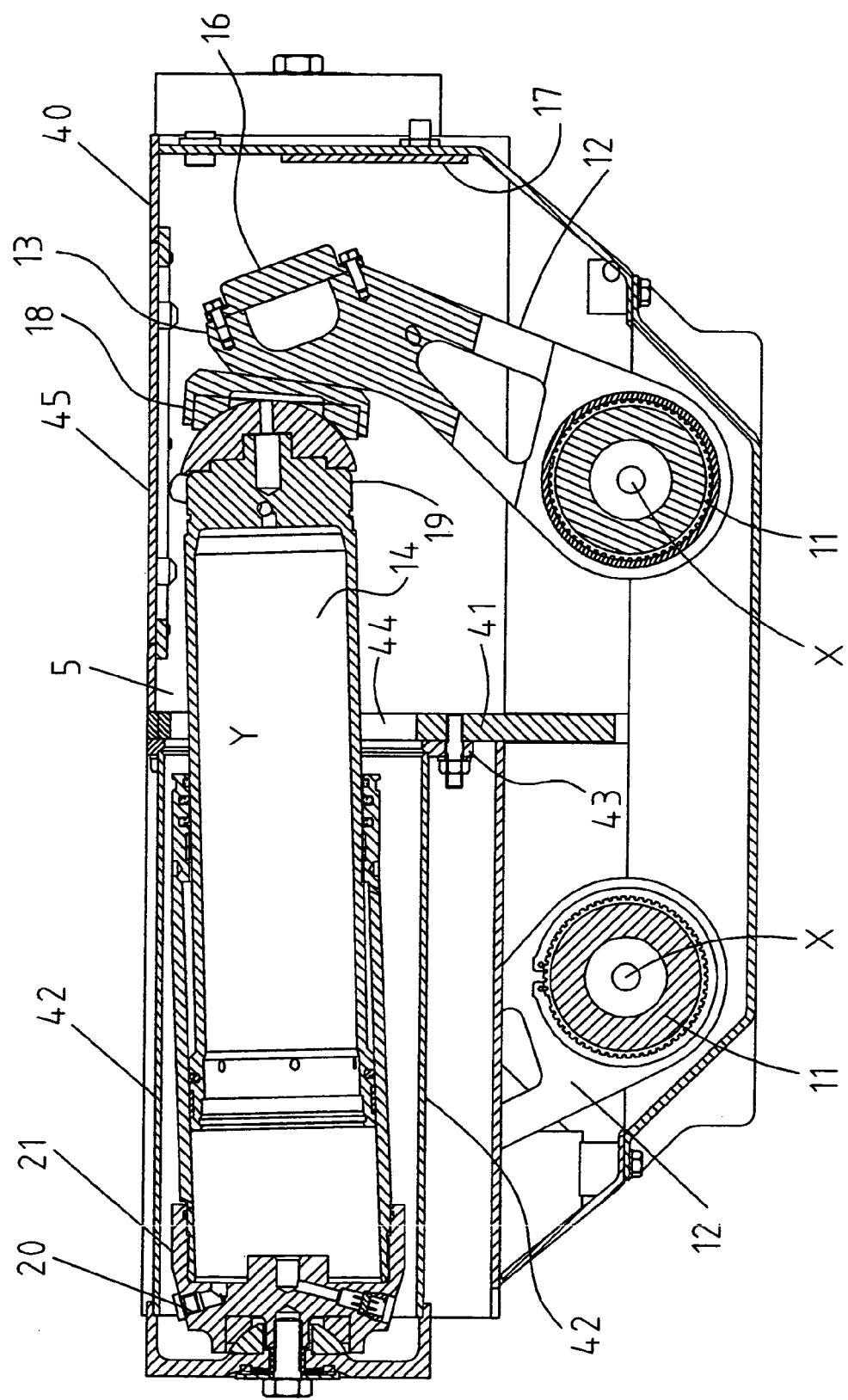
FIG. 5 is a sectional view taken along the line V—V of FIG. 4.
Figure 8:
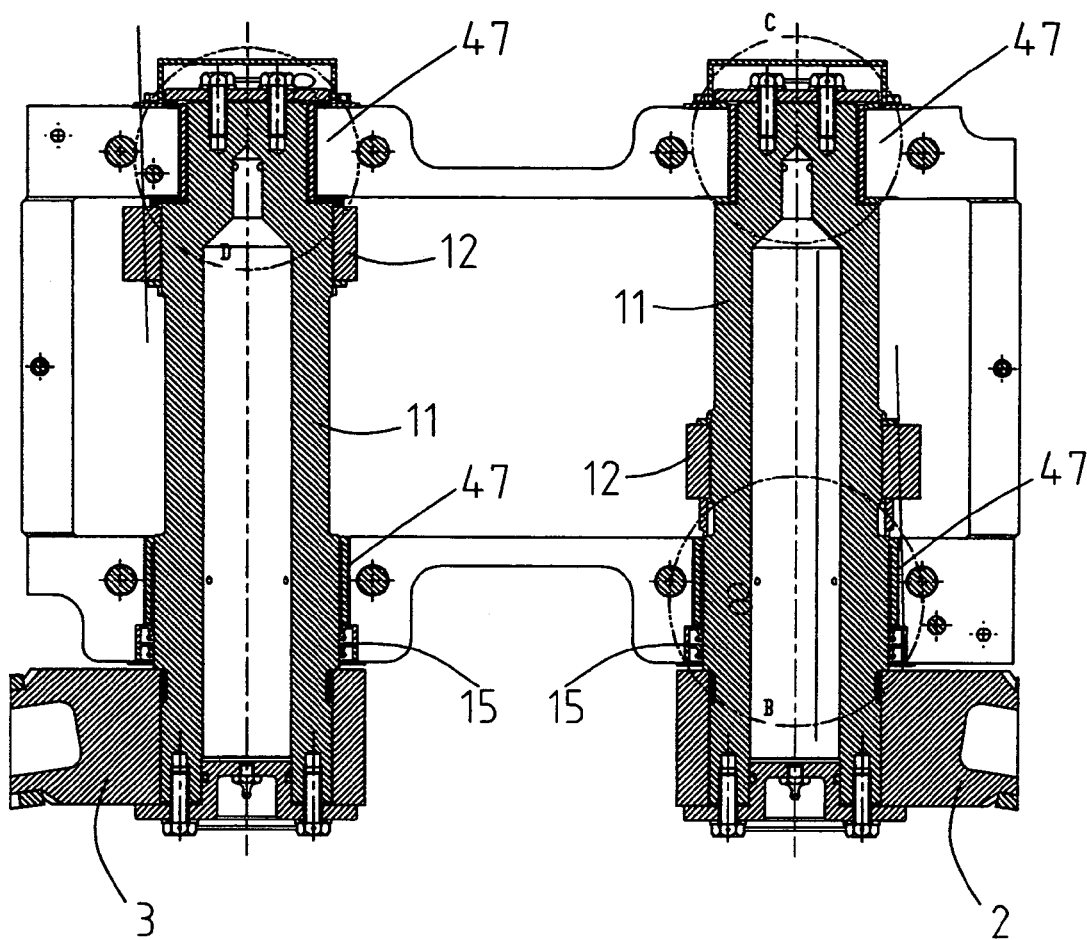
FIG. 8 is a sectional view taken along the line VIII—VIII of FIG. 7.

Referring to the drawings, and initially to FIGS. 1 to 15 thereof there is illustrated a modular leading/trailing arm suspension assembly according to the invention indicated generally by the reference numeral 1. The assembly 1 is in this case in the form of a two wheel station module. A pair of suspension arms, namely a leading forward suspension arm 2 and a trailing rear suspension arm 3 are pivotally mounted on a housing 4 containing spring means 5, 6 associated with each of the arms 2, 3 respectively. The housing 4 forms a support frame. Each suspension arm 2, 3 has an outer end 8 upon which are mounted a wheel support formed by a wheel hub assembly 9. In the illustrated embodiment the wheel hubs 9 are non-steering. It will be appreciated however that in other embodiments means may be provided for steering the hubs 9. An inner end 10 of each suspension arm 2, 3 is connected by a pivot shaft 11 with an associated lever arm 12 (FIG. 5) mounted within the housing 4. An upper end 13 of the lever arm 12 is connected to a spring element which in this case comprises a hydrostrut 14 which extends between the lever arm 12 and an inner side wall of the housing 4. The suspension arms 2, 3 are pivotable in a common vertical plane.

Each pivot shaft 11 passes through an opening in a side wall of the housing 4. A seal 15 is mounted in said opening about the shaft 11 to seal between the housing 4 and the shaft 11.

The lever arm 12 is provided with a resilient rebound stop 16 at the upper end 13 of the lever arm 12. This rebound stop 16 is engagable against an associated striking plate 17 on an inside face of a side wall of the housing 4. A swivel bearing 18 is mounted between the upper end 13 of the lever arm 12 and an inner end 19 of the hydrostrut 14. A second swivel bearing 20 is mounted between an outer end 21 of the hydrostrut 14 and an inner side wall of the housing 4 to transmit bump forces to the housing 4.

It will be noted that a pivot axis X about which each suspension arm 2, 3 rotates lies beneath the line of action Y of the hydrostrut 14 spring means.

It will also be noted that the pivot shaft 11, lever arm 12 and hydrostrut assemblies associated with each of the suspension arms 2, 3 are mounted side by side in an overlapping arrangement which provides a compact configuration. Also, the reaction forces of the hydrostruts 14 oppose each other when the hydrostruts 14 are in this opposed side by side arrangement. The hydrostruts 14 are supported in a substantially horizontal orientation.

In the illustrated embodiment the spring element is a hydrostrut 14 but in alternative embodiments various other spring media such as coil spring, rubber or any suitable elastic medium may be used. The mechanical rebound stops 16 react all the rebound forces directly on the housing 4 and likewise all the suspension bump forces are reacted directly into the housing 4 through the second bearings 20 mounted between each hydrostrut 14 and the housing 4. Both of the bearings 18, 20 allow pivoting movement at each end of the hydrostrut 14.

It will be noted that the complete assembly of moving parts are contained within the housing 4 and so are protected from dust, mud and mechanical impact. As the suspension and its force reaction elements are completely contained within the housing 4 the requirement for machining of the vehicle hull or accurate location of individual elements of a suspension system on the hull is eliminated.

Horizontal mounting plates or flanges are provided on the housing 4 comprising an inner mounting flange 30 and an outer mounting flange 31. The outer mounting flange 31 has a circular central pivot hole 32 on either side of which mounting slots 33 are provided. These mounting slots 33 are somewhat elongated and are for reception of undersize mounting bolts for attachment of the assembly 1 to an underside of a vehicle allowing some adjustment in a horizontal plane. The inner mounting flange 30 has a number of mounting slots 34 which are elongated and arranged such that a long axis of each slot 34 lies on the circumference of a circle having its centre at the pivot hole 32. Thus the pivot hole 32 can be engaged with a spigot, pivot pin or mounting bolt engaged with the pivot hole 32 and the underside of the vehicle and the whole assembly 1 can be pivoted about the pivot pin swinging about a vertical axis through the pivot pin (and pivot hole 32) for correct alignment of the assembly 1 on the vehicle body. Once in alignment mounting bolts are engaged through the slots 33, 34 to securely bolt the assembly 1 in position on the vehicle body.

The arrangement for pivoting the suspension assembly 1 on the bottom of the vehicle for alignment of the suspension arms 2 can be achieved in a number of ways. For example a spigot or stud may project downwardly from the bottom of the vehicle hull to engage in the pivot hole 32. Similarly, instead of the pivot hole 32 a pivot pin or stud may project upwardly from the mounting flange 31 to engage in a complementary mounting hole at the bottom of the vehicle hull. The key point is that the suspension system 1 can be offered up to the bottom of the vehicle and swivelled about a vertical axis for alignment of the two suspension arms 2, 3 and then bolted to the underside of the hull. The housing 4 will be inserted through an opening in the bottom of the hull and is protected within the hull during use. In this regard it will be noted that the mounting flanges 30, 31 project outwardly from the sides of the housing 4 just above the pivoting inner ends 10 of the suspension arms 2, 3.

The housing 4 has a pair of box chambers 40 offset and projecting outwardly from opposite sides of a common central strut mounting plate 41. Cylindrical strut casings 42, each having a flanged inner end 43, are bolted to the strut mounting plate 41 to form an extension of each box chamber 40. The lever arm 12 and an inner end 19 of its associated hydrostrut 14 are housed within each box chamber 40 and the outer end 21 of the hydrostrut 14 is housed within the attached strut casing 42. The hydrostrut 14 passes through an opening 44 in the strut mounting plate 41. A removable access panel 45 is bolted over an access opening in a top of each box chamber 40.

Split bearings 46 are mounted at the bottom of the housing 4 for rotatably supporting each pivot shaft 11, each of which extends between journal bearing mounts 47 at opposite sides of the housing 4. A lower bearing block part 48 is bolted to a complementary upper bearing block part 49 by bolts 49a.

Figure 7:
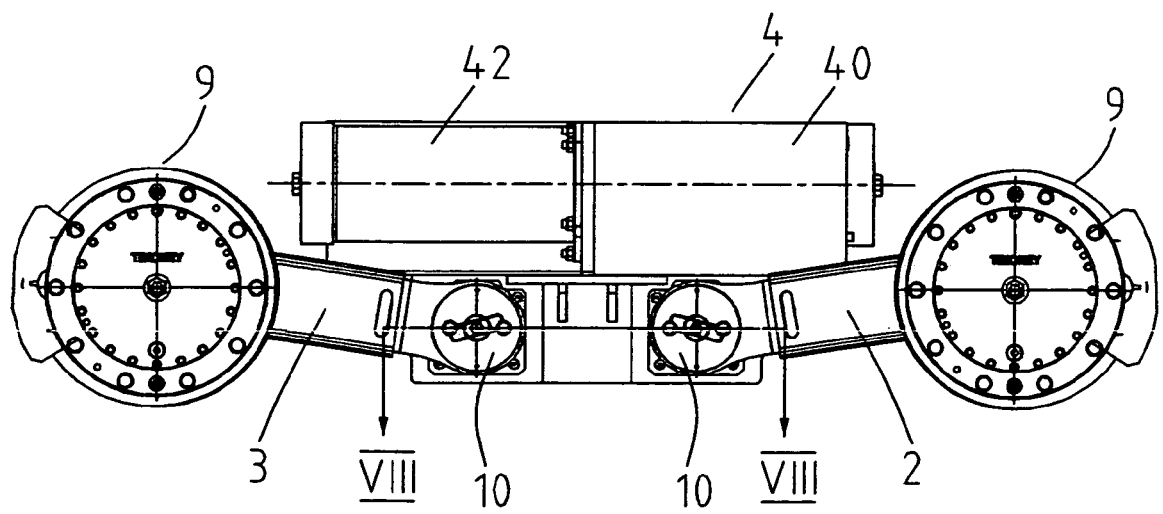
FIG. 7 is an elevational view of the assembly.

It will be appreciated that the invention provides a suspension assembly 1 of compact construction which can be mounted to an underside of the vehicle to minimise or eliminate intrusion into the interior volume of the vehicle. The modular assemblies are easy to fit and align on the vehicle body and require only one mounting point on the armoured hull. All of the interconnected moving elements and bearings are contained within a sealed housing. Also, all the bump and rebound forces are reacted within the assembly. While the inclusion of bump stops and rebound stops within the housing is desirable it is envisaged that in some configurations these may be omitted from the housing if desired. It is advantageous that the front suspension arm 2 rises between the inner end 10 and outer end 8. When the vehicle hits a bump the front leading arm with wheel will rise and move rearwards relieving the loads. In similar fashion the trailing rear suspension arm 3 rises between its inner end 10 and outer end 8. This arrangement is best seen in FIG. 7.

It will be noted also that the compact arrangement of the assembly 1 allows clearance for delivery of a drive shaft to the hub assemblies 9 if required.

With the twin suspension arm arrangement illustrated the suspension has zero net average torque applied to the hull mounting because the suspension arms produce opposite and on average equal torques.

Regarding the provision of a drive for the wheels this can be done in a number of different ways. For example a drive train may be fed through the suspension arm. Alternatively an electric motor could be provided in the hub and cabling and a cooling system delivered through the suspension arm through the electric motor.

It will be noted that the suspension module is completely self contained with bump and rebound stops installed within the assembly. The suspension module 1 is mounted underneath the hull floor and so does not intrude between the wheel and the hull wall, as with conventional designs. This enables the crew compartment width extend right out to the tyre side wall, maximising the interior width for any given overall width constraint. The under floor mounting of the suspension module 1 facilitates fore and aft alignment and allows the unit to be directly mounted to the hull without the necessity for machining of the mounting surface. Alignment may be done by means of slotted mounting holes laser cut in the hull plate prior to welding or by imbedding of suitable hard points in the case of non-metallic hulls. The under floor location gives a more benign load path than side wall mounting, especially in composite structures where side wall loadings from suspension mounts can lead to delamination of the wall. Thus the hull structure can be lighter. The hydrostrut units are not exposed, as in conventional designs, but are in a dedicated enclosure within the hull, protected from ingress of mud and dirt which can lead to degradation of seals and premature failure, especially in prolonged service in harsh environments, with mud, dust and salt water exposure.

FIGS. 16 to 33 show various other embodiments of the invention and parts similar to those described previously are assigned the same reference numerals in these drawings.

Figure 16:
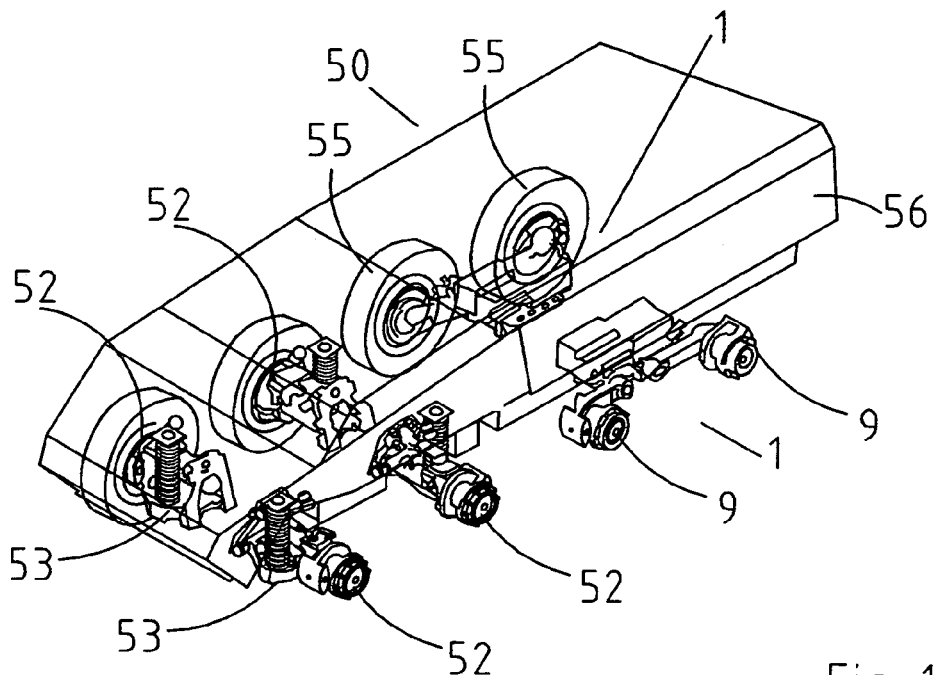
FIG. 16 is a perspective view showing a vehicle layout incorporating the suspension assembly of the invention.

Referring to FIG. 16 there is shown a vehicle 50 incorporating two of the suspension assemblies 1 described previously. In this layout the platform is an eight by eight wheeled configuration with conventional Ackerman type steering on the front four wheels 52 which in this case are located by a double wishbone suspension 53. Two pairs of rear wheels 55 are mounted on a hull 56 of the vehicle 50 by means of the suspension assemblies 1 which are bolted to the bottom of the hull 56.

Figure 17:
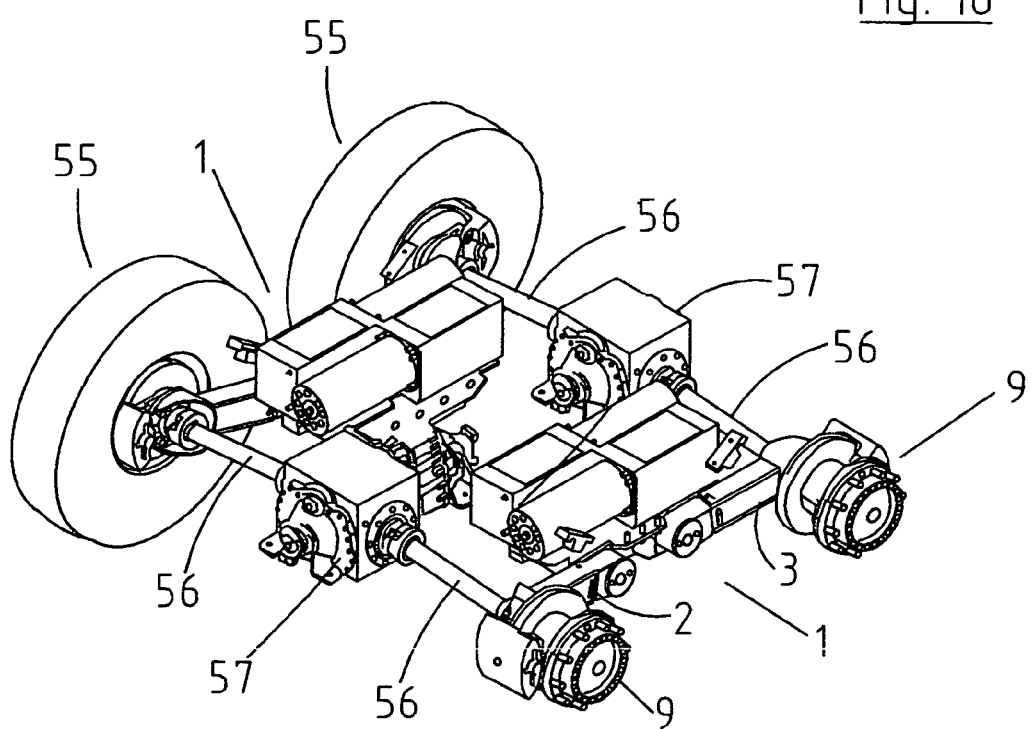
FIG. 17 is a perspective view of a pair of the suspension assemblies of the invention as used in the vehicle shown in FIG. 16.

FIG. 17 shows four rear wheels 55 which are driven by conventional prop shafts 56 connecting the hubs 9 directly to differentials 57 which are mounted midships underneath the inner armour floor of the vehicle and connected by a drive transmission to an engine of the vehicle. The driveline is fitted with traction control, CTI, lockup and ABS.

Figure 18:
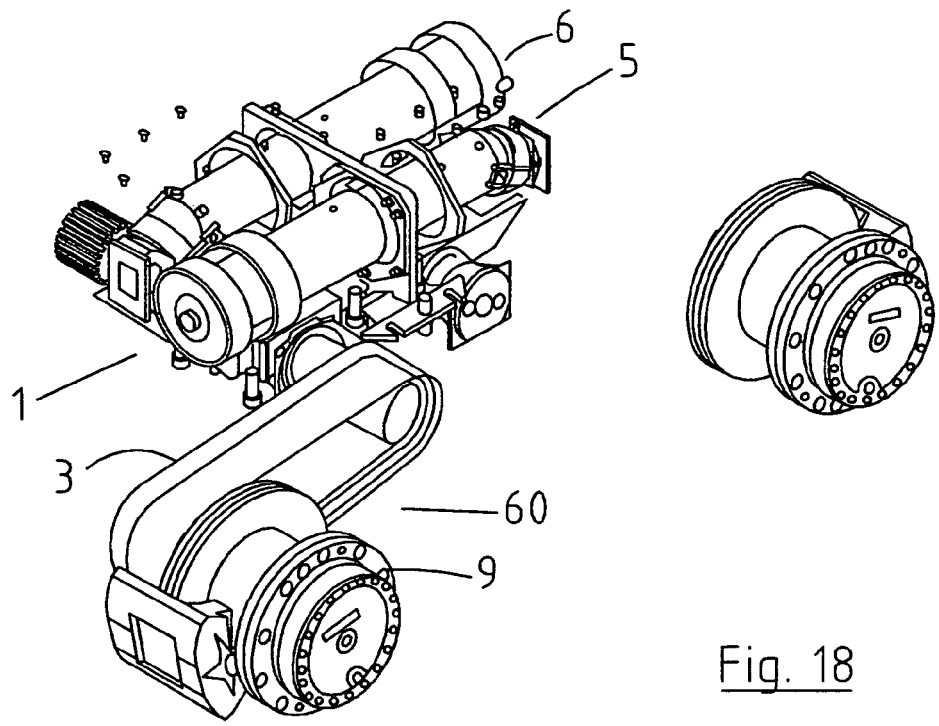
FIG. 18 is a perspective view of a suspension assembly according to another embodiment of the invention.

Referring to FIG. 18 an in-arm drive arrangement is shown in which drive to the hub 9 is delivered through the suspension arm 3. The drive is carried from a single differential to a splitter box integrated to the suspension module from which it is carried through the suspension arm journal by a shaft and down the suspension arm 2, 3 by a precision high performance inverted tooth chain drive indicated generally by the reference numeral 60.

Figures 19, 20:
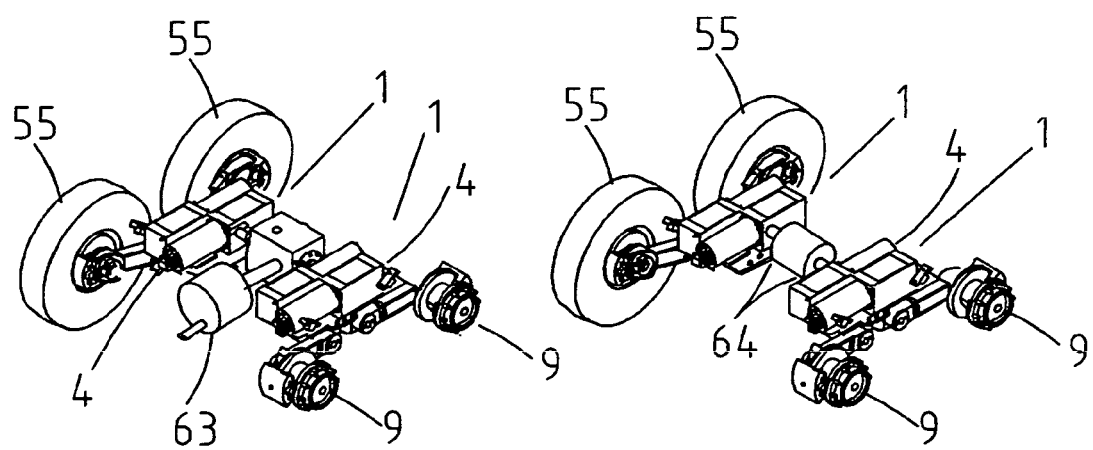
FIG. 19 is a perspective view similar to FIG. 17 showing an electric drive system for wheels carried by the suspension assembly.
FIG. 20 is a view similar to FIG. 19 showing an alternative arrangement of electric drive for the wheels.

FIGS. 19 and 20 show various electric drive arrangements with in-arm drive for use with the suspension assemblies 1. An in-arm driveline with a single differential per four wheel bogie lends itself very well to the incorporation of electric drive with either a single motor 63 as illustrated in FIG. 19, two motors 64 as illustrated in FIG. 20 or four motors.

Figure 21:
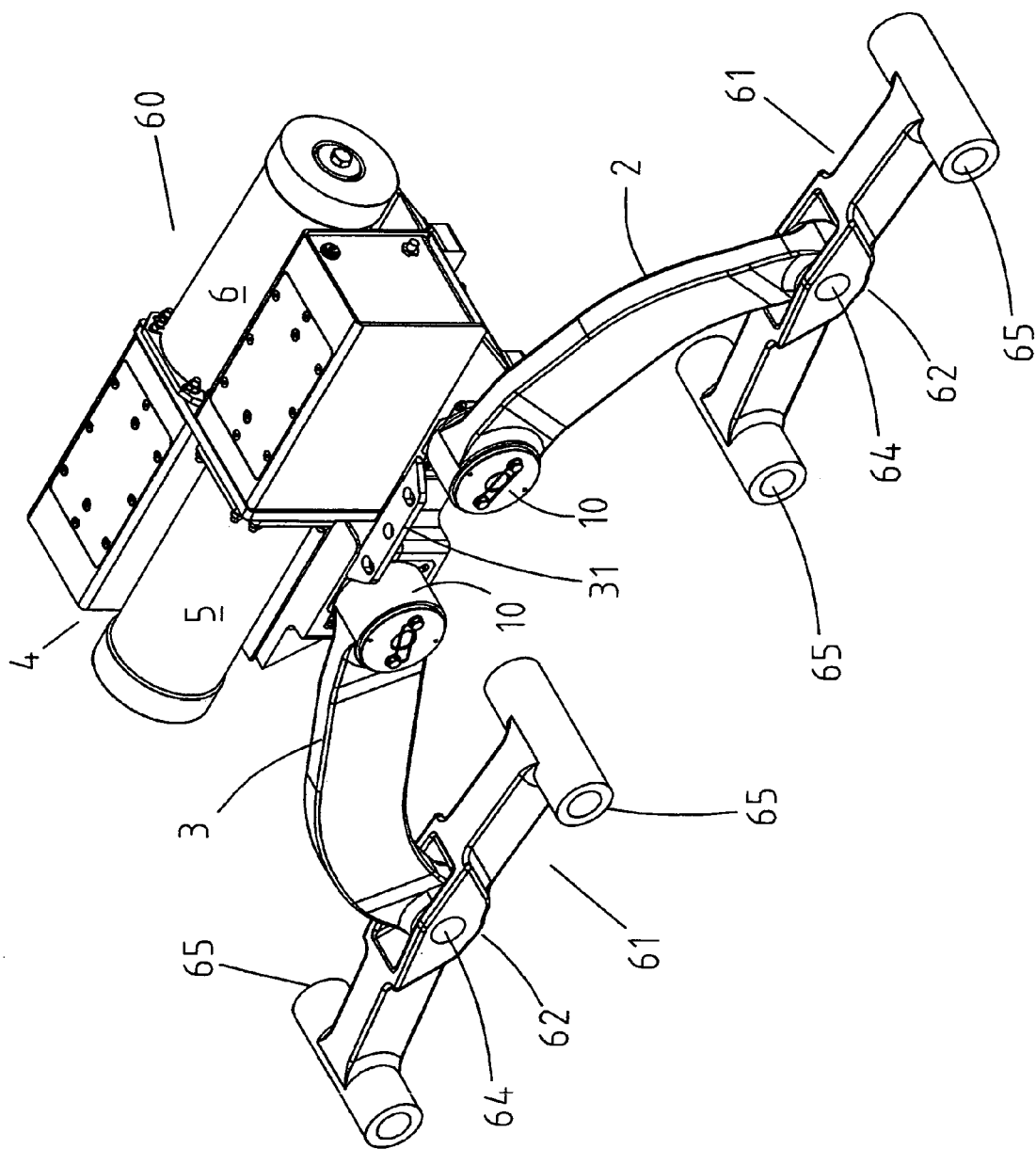
FIG. 21 is a perspective view of a suspension assembly according to another embodiment of the invention.
Figure 22:
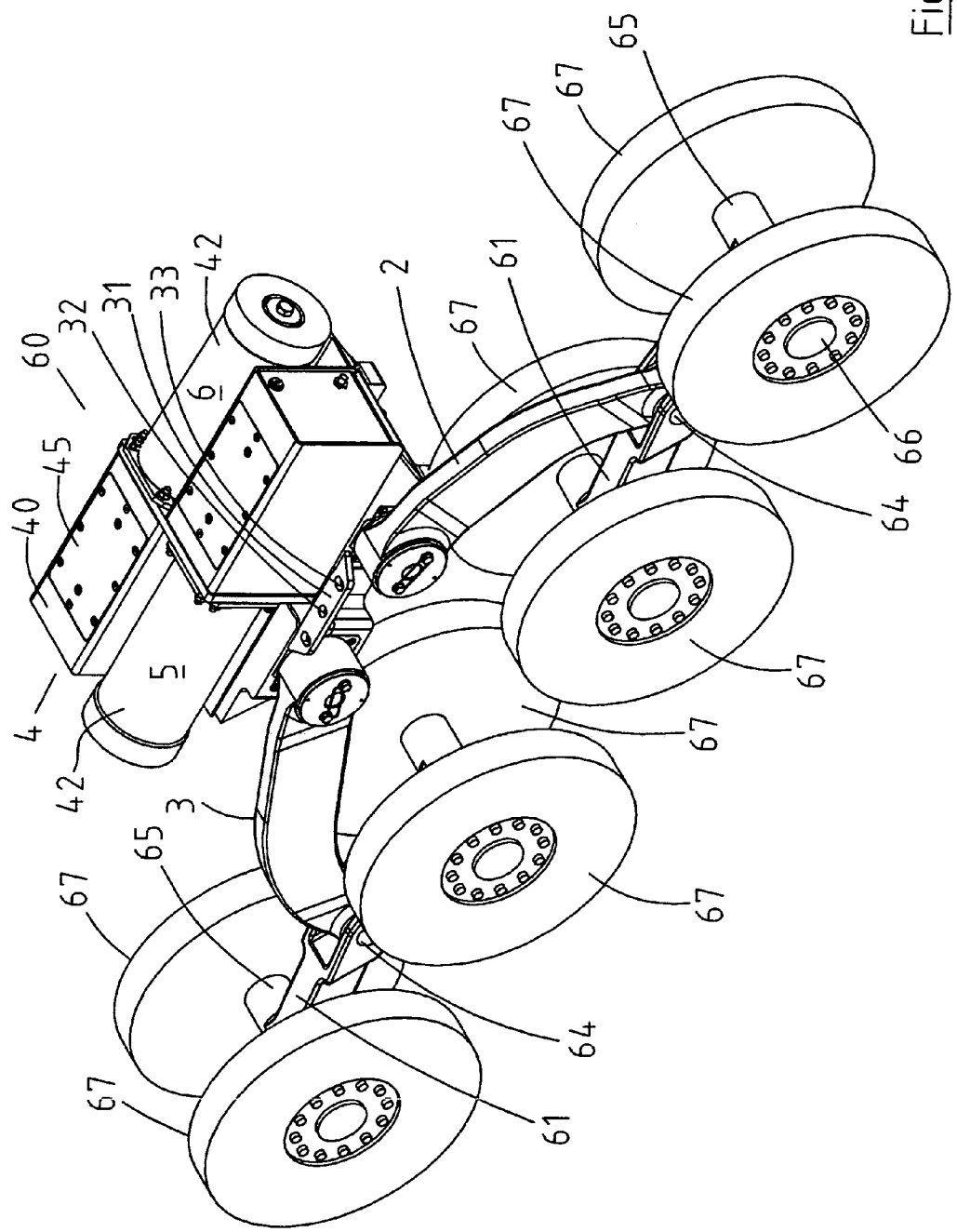
FIG. 22 is a perspective view of the suspension assembly shown in FIG. 21.
Figure 23:
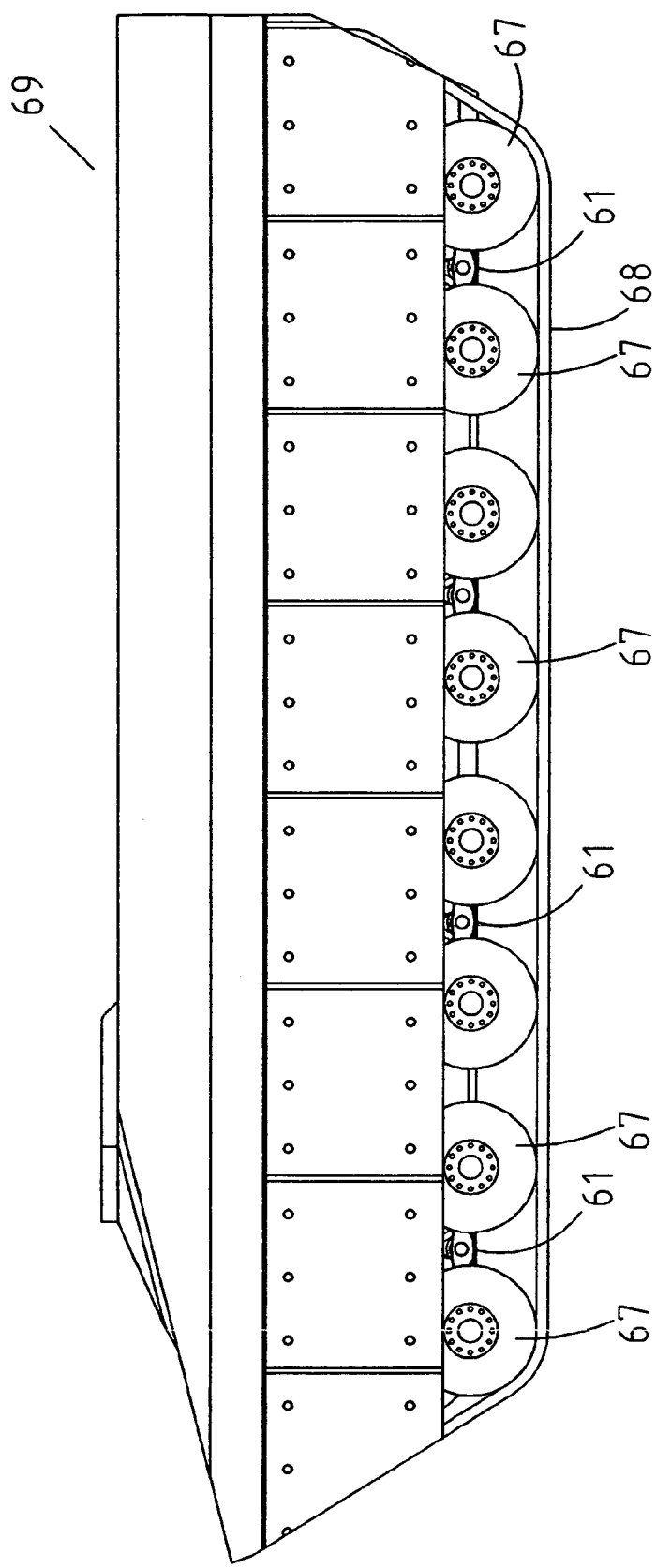
FIG. 23 is an elevational view of an armoured vehicle incorporating a number of the suspension assemblies of the type shown in FIGS. 21 and 22.
Figure 24:
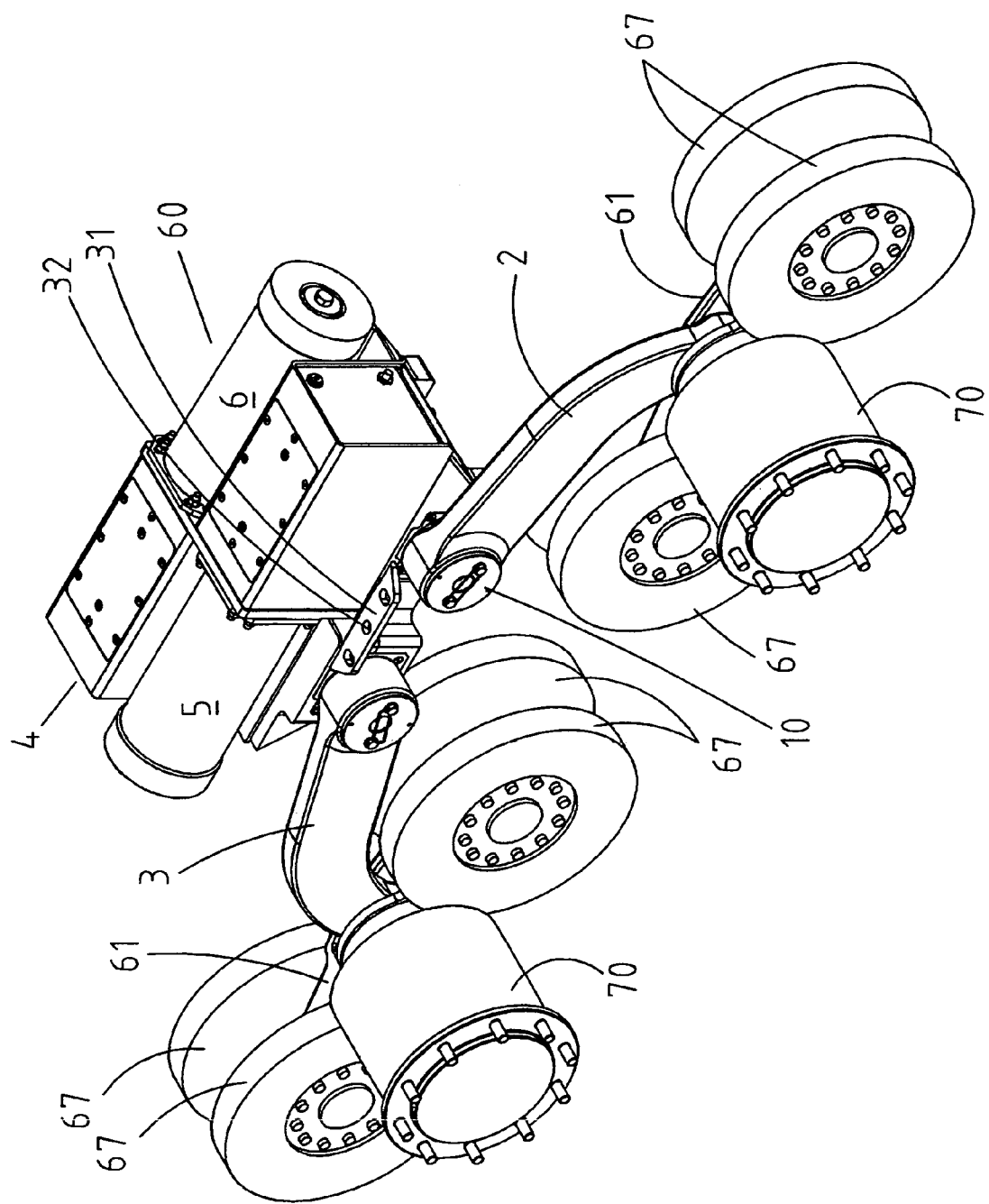
FIG. 24 is a perspective view of a still further suspension assembly according to the invention.
Figure 25:
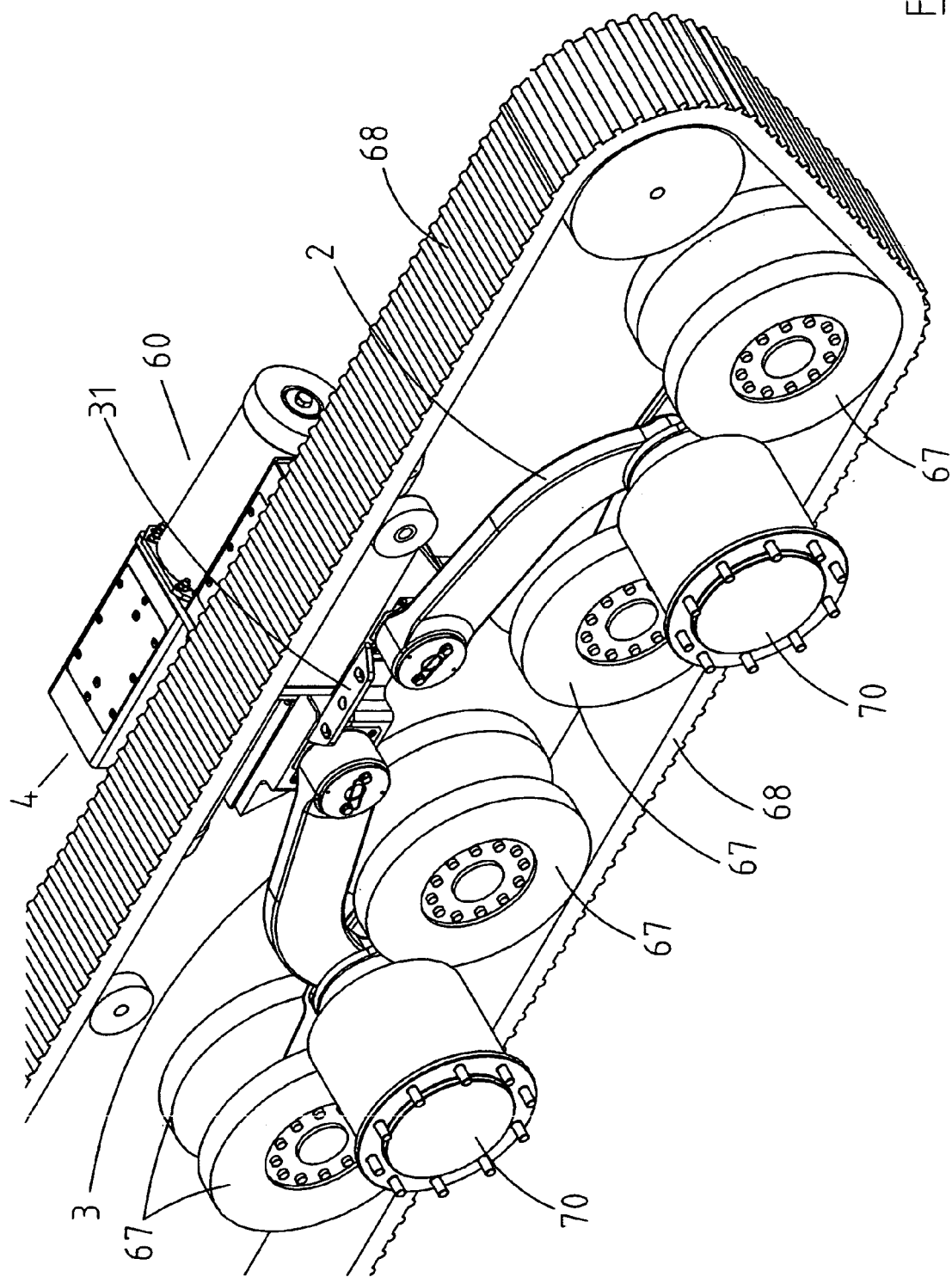
FIG. 25 is another perspective view of the suspension assembly shown in FIG. 24 showing a track mounted on the suspension assembly.

Referring now to FIGS. 21 to 23 an arrangement of the suspension assembly for a tracked vehicle 69 is shown, indicated generally by the reference numeral 60. In this suspension assembly 60 a rocking beam 61 is mounted at an outer end of each suspension arm 2, 3. A centre 62 of each rocking beam 61 is pivotally mounted on the suspension arm 2, 3 by a pivot pin 64 for pivotal movement about a horizontal pivot axis. Bushings 65 at each end of the rocking beam 61 receive pivot shafts 66 carrying pairs of wheels 67 for engaging and supporting a track 68 on the vehicle 69.

Referring now to FIGS. 24 to 30 there is shown another variation in this case for a hybridised track/wheel design. This is similar to the suspension assembly 60 described with reference to FIGS. 21 to 23. In this case however there is additionally a wheel support hub 70 mounted co-axially with the pivot pins 64 of the rocking beams 61. The wheel hubs 70 carry wheels 71 as shown in FIGS. 26 and 27 which extend below the track 68. The track wheels 67 are sized so that the track 68 is some distance above the ground contact point of the road wheels 71. All road wheels 71 are fitted with in-hub motors and directional control is by skid steering. When the vehicle 75 is operating on firm ground it functions as a wheeled vehicle with all the advantages inherent in this—high speed, strategic mobility, low running costs. When the vehicle enters soft ground, which exceeds the floatation capacity of the tyres, it sinks until the tracks 68 take up the load. With suitable control algorithms for control of the motors the track drive will be automatically engaged when the load and drag on the track is sensed. Road wheel drive will be maintained and the tractive effort will be optimally distributed between the tracks and the wheels to maximise mobility in all terrains. Because the road wheels are not required to provide the floatation and soft terrain capability normally required of off-road wheeled vehicles smaller, lighter wheels and tyres may be used reducing the weight and space (especially width) claim of the wheels. Similarly, as the tracks are not required to operate on hard, broken terrain to the same extent as those on a conventional tracked vehicle would be the track structure and weight can be significantly reduced compared to a normal track. Also, since the wheels do contribute significantly to floatation and traction in soft ground, the tracks may be narrower than would be required on a tracked vehicle.

Figure 31:
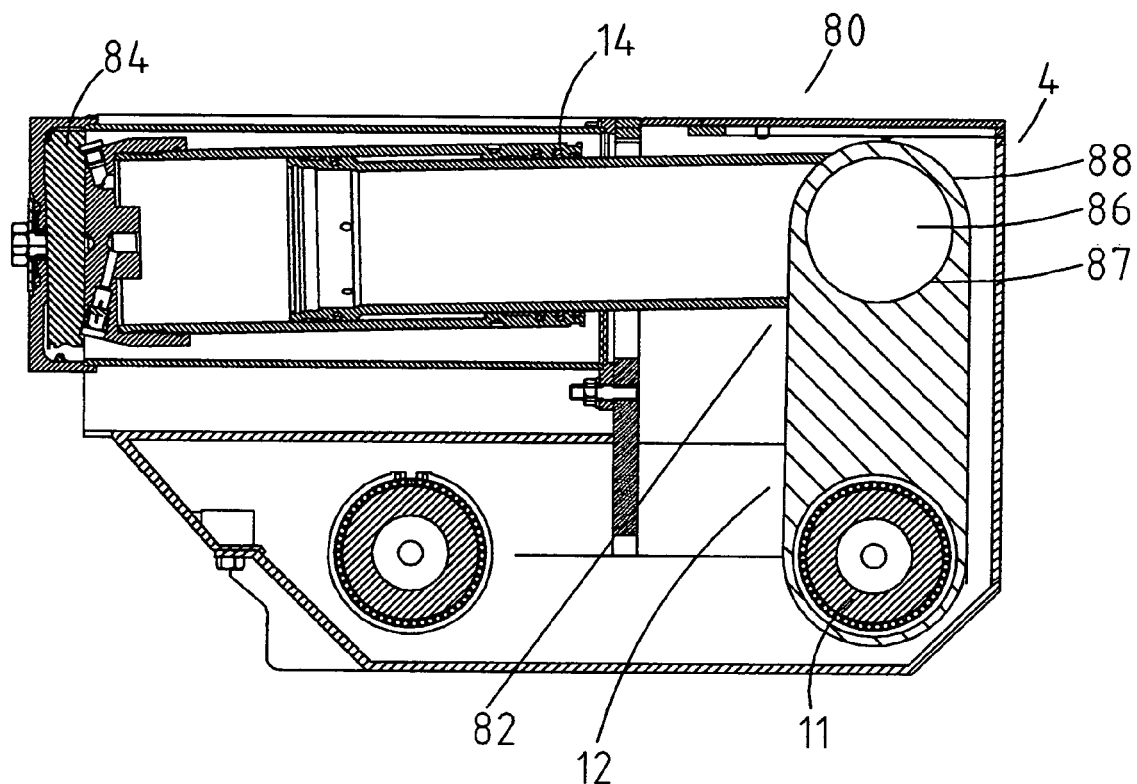
FIG. 31 is a detail sectional elevational view of portion of another suspension assembly according to the invention.
Figure 32:
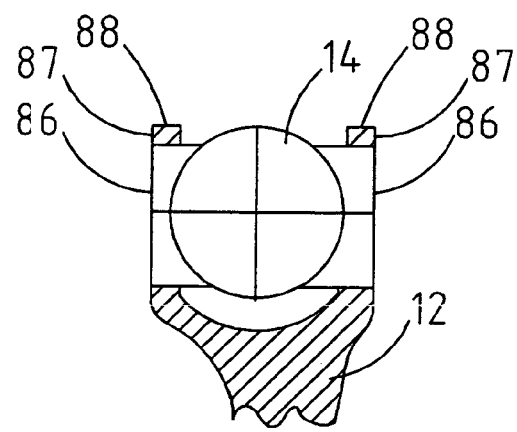
FIG. 32 is a detail sectional view of portion of the suspension assembly shown in FIG. 31.

Referring now to FIGS. 31 and 32 there is shown another suspension assembly indicated generally by the reference numeral 80. In this case the lever arm 12 is connected at its upper end to the hydrostrut 14 by means of a fork and trunnion connector indicated generally by the reference numeral 82. The other end of the hydrostrut 14 is mounted on the wall of the housing 4 by an elastomeric flexible mounting 84. The connector 82 is formed by laterally projecting trunnion pins 86 on the hydrostrut 14 which are rotatably journalled in associated bearing holes 87 in forked arms 88 at an upper end of the lever arm 12. This construction advantageously allows the length of the housing 4 to be reduced providing a more compact modular construction for the suspension assembly 80.

Figure 33:
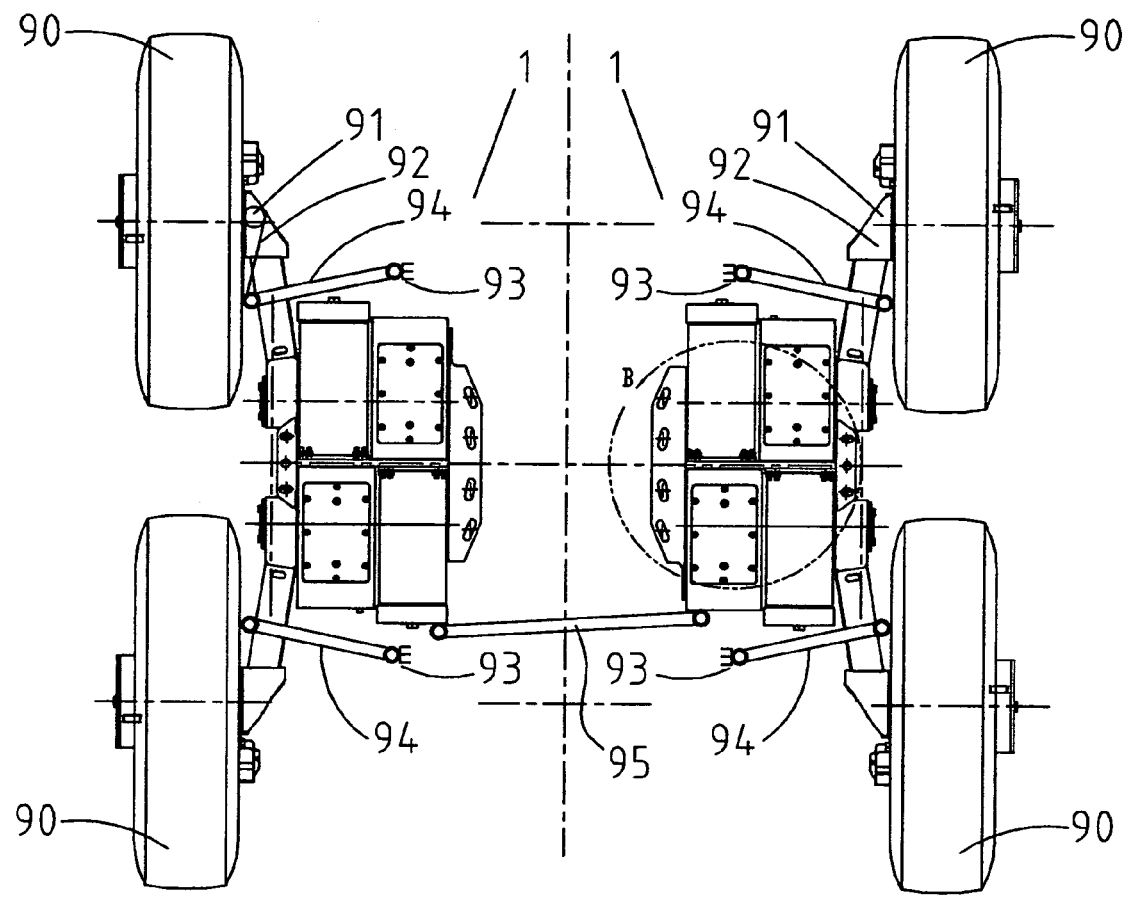
FIG. 33 is a plan view illustrating a pair of the suspension assemblies of the type shown in FIG. 1 arranged in a steerable bogie configuration.

Referring now to FIG. 33 there is shown an arrangement whereby a pair of the suspension assemblies 1 are each mounted in a bogie arrangement for swivelling about a vertical axis on the underside of the vehicle hull. Each wheel 90 is pivotally mounted on the suspension arms 2, 3 at 91. A steering arm 92 mounted on the wheel sub axle is pivotally joined to a fixed point 93 by means of a drag link 94. A bogie track rod 95 is provided between the two bogies. When the bogies carrying the suspension assemblies 1 are rotated the wheels 90 are rotated relative to the bogies with the geometry suitably adjusted by the relative positioning of the steering arm 92 pivots and the drag link 94 anchorage points to give the required steering geometry.

In another arrangement the drag link mounting point 93 may be provided with a means to alter its position such that no relative movement of the wheel 90 and bogie occurs.

It will be appreciated that the same suspension can be used for either road wheels or tracks, simply by changing the wheel carriers at the outer end of each suspension arm.

What is claimed is:

1. A modular suspension assembly for an armoured vehicle, including:
    a support frame,
    a pair of suspension units mounted on the support frame, namely a leading arm suspension unit and a trailing arm suspension unit,
    each suspension unit including a suspension arm having an outer end and an inner end,
    said outer end having means for connection to a wheel or track support,
    said inner end being pivotally mounted on the support frame and connected to a spring means on the support frame which opposes pivotal movement of the suspension arm away from a neutral position,
    the suspension arms being pivotal in a vertical plane,
    the support frame having mounting means for securing the support frame to a bottom of a vehicle hull upon which the modular suspension assembly is to be mounted.

2. A suspension assembly as claimed in claim 1 wherein the mounting means is adjustable to allow pivoting of the support frame about a vertical axis to facilitate correct alignment of the suspension arms on the vehicle hull.

3. A suspension assembly as claimed in claim 2 wherein the mounting means comprises a pair of spaced-apart horizontal mounting flanges on the support frame having vertical through holes for reception of associated mounting bolts to secure the mounting frame to the bottom of the vehicle hull.

4. A suspension assembly as claimed in claim 3 wherein the through holes include a circular pivot hole in one flange for reception of a pivot pin and a plurality of elongate slots, a long axis of each slot lying on the circumference of a circle having its centre at the pivot hole.

5. A suspension assembly as claimed in claim 1 wherein a pivot axis about which each suspension arm rotates lies beneath the line of action of the spring means.

6. A suspension assembly as claimed in claim 1 wherein the spring means for the suspension arms are mounted on the support frame in a substantially horizontal side by side orientation.

7. A suspension assembly as claimed in claim 1 wherein the inner end of each suspension arm is connected to a lever arm which in turn acts on the spring means.

8. A suspension assembly as claimed in claim 7 wherein the support frame has a sealed housing within which the lever arms and spring means associated with the suspension arms are mounted, each lever arm being connected to a suspension arm by a pivot shaft which projects outwardly through a complementary opening in a side wall of the housing, a seal being mounted in said opening about the shaft to seal between the housing and the shaft.

9. A suspension assembly as claimed in claim 1 wherein each suspension arm inclines upwardly from the inner end to the outer end of the suspension arm.

10. A suspension assembly as claimed in claim 9 wherein the suspension arm of the front leading arm suspension unit has its outer end located forwardly of its inner end, and the suspension arm of the rear trailing arm suspension unit has its outer end located rearwardly of its inner end.

11. A suspension assembly as claimed in claim 1 wherein means is provided at the outer end of each suspension arm for demountably securing a wheel or track support at said outer end.

12. A suspension assembly as claimed in claim 1 wherein the spring means is a hydrostrut.

13. A suspension assembly as claimed in claim 12 wherein swivel connectors are mounted at each end of the hydrostrut for connection between the hydrostrut and the support frame and the lever arm.

14. A suspension assembly as claimed in claim 13 wherein a fork and trunnion connector is provided between the lever arm and the hydrostrut.

15. A suspension assembly as claimed in claim 13 wherein an elastomeric flexible mount is provided between the hydrostrut and the support frame.

16. A suspension assembly as claimed in claim 13 wherein swivel bearings are provided between each end of the hydrostut and the support frame and the lever arm.

17. A suspension assembly as claimed in claim 1 wherein a rocking beam is mounted at an outer end of each suspension arm, a centre of the rocking beam being pivotally mounted on the suspension arm by a pivot pin extending between the beam and the suspension arm for pivotal movement about a horizontal pivot axis, a wheel or track support being mounted at each end of the rocking beam.

18. A suspension assembly as claimed in claim 17 wherein track supports are mounted at each end of the rocking beam and a wheel support is mounted co-axially with the pivot pin on the rocking beam or suspension arm.

19. A suspension assembly as claimed in claim 1 wherein the support frame forms a bogie with means for pivotally mounting the bogie on the bottom of the vehicle hull, the bogie having means for connection to a steering system of the vehicle for controlled pivoting of the bogie in response to a steering command from the steering system.

20. A suspension assembly as claimed in claim 19 wherein steerable wheels are mounted at the outer ends of the suspension arms by swivel mounts, a steering arm of the swivel mount being connected by a drag link to a fixed mounting point to provide differential steering of the wheels in response to rotation of the bogie.

21. A modular suspension assembly for an armoured vehicle, including:
    a support frame,
    a pair of suspension units mounted on the support frame, namely a leading arm suspension unit and a trailing arm suspension unit,
    each suspension unit including a suspension arm having an outer end and an inner end,
    said outer end having means for connection to a wheel or track support,
    said inner end being pivotally mounted on the support frame and connected to a spring means on the support frame which opposes pivotal movement of the suspension arm away from a neutral position,
    the suspension arms being pivotal in a vertical plane,
    the support frame having mounting means for securing the support frame to a bottom of a vehicle hull upon which the modular suspension assembly is to be mounted,
    the mounting means being adjustable to allow pivoting of the support frame about a vertical axis to facilitate correct alignment of the suspension arms on the vehicle hull.

22. A modular suspension assembly for an armoured vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a vertical plane,
the support frame having mounting means for securing the support frame to a bottom of a vehicle hull upon which the modular suspension assembly is to be mounted,
the mounting means being adjustable to allow pivoting of the support frame about a vertical axis to facilitate correct alignment of the suspension arms on the vehicle hull,
the mounting means comprises a pair of spaced-apart horizontal mounting flanges on the support frame having vertical through holes for reception of associated mounting bolts to secure the mounting frame to the bottom of the vehicle hull,
the through holes include a circular pivot hole in one flange for reception of a pivot pin and a plurality of elongate slots, a long axis of each slot lying on the circumference of a circle having its centre at the pivot hole.

23. A modular suspension assembly for an armoured vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a vertical plane,
the support frame having mounting means for securing the support frame to a bottom of a vehicle hull upon which the modular suspension assembly is to be mounted,
the spring means for the suspension arms being mounted on the support frame in a substantially horizontal side by side orientation.

24. A modular suspension assembly for an armoured vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a vertical plane,
the support frame having mounting means for securing the support frame to a bottom of a vehicle hull upon which the modular suspension assembly is to be mounted,
the inner end of each suspension arm is connected to a lever arm which in turn acts on the spring means,
the mounting frame has a sealed housing within which the lever arms and spring means associated with the suspension arms are mounted, each lever arm being connected to a suspension arm by a pivot shaft which projects outwardly through a complementary opening in a side wall of the housing, a seal being mounted in said opening about the shaft to seal between the housing and the shaft.

25. A modular suspension assembly for an armoured vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a vertical plane,
the support frame having mounting means for securing the support frame to a bottom of a vehicle hull upon which the modular suspension assembly is to be mounted,
each suspension arm inclines upwardly from the inner end to the outer end of the suspension arm.

26. A modular suspension assembly for an armoured vehicle, including:
a support frame,
a pair of suspension units mounted on the support frame, namely a leading arm suspension unit and a trailing arm suspension unit,
each suspension unit including a suspension arm having an outer end and an inner end,
said outer end having means for connection to a wheel or track support,
said inner end being pivotally mounted on the support frame and connected to a spring means on the support frame which opposes pivotal movement of the suspension arm away from a neutral position,
the suspension arms being pivotal in a vertical plane,
the support frame having mounting means for securing the support frame to a bottom of a vehicle hull upon which the modular suspension assembly is to be mounted,
the mounting means is adjustable to allow pivoting of the support frame about a vertical axis to facilitate correct alignment of the suspension arms on the vehicle hull,
the mounting means comprises a pair of spaced-apart horizontal mounting flanges on the support frame having vertical through holes for reception of associated mounting bolts to secure the support frame to the bottom of the vehicle hull,
the through holes include a circular pivot hole in one flange for reception of a pivot pin and a plurality of elongate slots, a long axis of each slot lying on the circumference of a circle having its centre at the pivot hole, the spring means for the suspension arms are mounted on the support frame in a substantially horizontal side by side orientation, the inner end of each suspension arm is connected to a lever arm which in turn acts on the spring means, the support frame has a sealed housing within which the lever arms and spring means associated with the suspension arms are mounted, each lever arm being connected to a suspension arm by a pivot shaft which projects outwardly through a complementary opening in a side wall of the housing, a seal being mounted in said opening about the shaft to seal between the housing and the shaft, each suspension arm inclines upwardly from the inner end to the outer end of the suspension arm, the suspension arm of the front leading arm suspension unit has its outer end located forwardly of its inner end, and the suspension arm of the rear trailing arm suspension unit has its outer end located rearwardly of its inner end, the spring means being a hydrostrut.

* * * * *